(12) United States Patent
Arico

(10) Patent No.: US 11,840,165 B2
(45) Date of Patent: Dec. 12, 2023

(54) VEHICLE HEAD RESTRAINT WITH ARTICULATING SURFACE

(71) Applicant: GM Global Technology Operations LLC, Detroit, MI (US)

(72) Inventor: Daniel Arico, New Baltimore, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/745,151

(22) Filed: May 16, 2022

(65) Prior Publication Data
US 2023/0365040 A1    Nov. 16, 2023

(51) Int. Cl.
*A47C 1/10* (2006.01)
*B60N 2/806* (2018.01)

(52) U.S. Cl.
CPC .................. *B60N 2/806* (2018.02)

(58) Field of Classification Search
CPC .......... B60N 2/859; B60N 2/856; B60N 2/80; B60N 2/838
See application file for complete search history.

(56) References Cited

U.S. PATENT DOCUMENTS

| | | | | |
|---|---|---|---|---|
| 2,466,553 A | * | 4/1949 | Kunes ...................... | B60N 2/64 297/410 |
| 2,592,160 A | * | 4/1952 | Kunes .................... | A47K 3/125 4/575.1 |
| 5,181,758 A | * | 1/1993 | Sandvik .................. | B60R 22/18 297/483 |
| 5,738,411 A | * | 4/1998 | Sutton ...................... | B60N 2/36 297/378.12 |
| 5,826,942 A | * | 10/1998 | Sutton .................... | B60N 2/809 297/378.12 |
| 6,129,421 A | * | 10/2000 | Gilson ................... | B60N 2/859 297/403 |
| 6,616,235 B1 | * | 9/2003 | Khavari ................. | B60N 2/847 297/410 |
| 7,341,312 B2 | * | 3/2008 | Gauthier ................ | B60N 2/856 297/408 |
| 7,410,218 B2 | * | 8/2008 | Kotani ................... | B60N 2/885 297/391 |
| 7,559,608 B2 | * | 7/2009 | Miyahara ............... | B60N 2/847 297/378.12 |
| 7,681,954 B2 | * | 3/2010 | Barrou ................... | B64D 11/06 297/408 |
| 7,758,126 B2 | * | 7/2010 | Haase ...................... | B60N 2/20 297/378.12 |

(Continued)

FOREIGN PATENT DOCUMENTS

DE    102011082637 A1    3/2013

OTHER PUBLICATIONS

German Application No. 10 2022 127 467.5 filed Oct. 19, 2022; German Office Action dated Aug. 7, 2023; 4 pages.

*Primary Examiner* — Shin H Kim
(74) *Attorney, Agent, or Firm* — CANTOR COLBURN LLP

(57) ABSTRACT

A vehicle head restraint includes a head restraint support, a first head restraint member fixedly coupled to the head restraint support, and a second head restraint member attached to the first head restraint member. The second head restraint member is selectively moveable relative to the first head restraint member.

18 Claims, 6 Drawing Sheets

(56) References Cited

U.S. PATENT DOCUMENTS

| | | | | |
|---|---|---|---|---|
| 8,002,356 B2* | 8/2011 | Lutzka | ............ | B60N 2/859 |
| | | | | 297/403 |
| 8,128,162 B2* | 3/2012 | Gerhardt | ............ | B60N 2/757 |
| | | | | 297/410 |
| 8,182,037 B2* | 5/2012 | Jeong | ............ | B60N 2/36 |
| | | | | 297/378.12 |
| 8,197,007 B2* | 6/2012 | Lutzka | ............ | B60N 2/844 |
| | | | | 297/391 |
| 8,348,347 B2* | 1/2013 | Willard | ............ | B60N 2/847 |
| | | | | 297/408 |
| 8,465,098 B2* | 6/2013 | Yetukuri | ............ | B60N 2/856 |
| | | | | 297/331 |
| 11,135,958 B2* | 10/2021 | Chaer | ............ | B60N 2/874 |
| 2004/0217641 A1* | 11/2004 | Lampke | ............ | B60N 2/838 |
| | | | | 297/216.12 |
| 2005/0264078 A1* | 12/2005 | Saberan | ............ | B60N 2/874 |
| | | | | 297/408 |
| 2006/0061187 A1* | 3/2006 | Gauthier | ............ | B60N 2/80 |
| | | | | 297/408 |
| 2008/0284225 A1* | 11/2008 | Gauthier | ............ | B60N 2/859 |
| | | | | 297/404 |
| 2011/0057495 A1 | 3/2011 | Buccinna | | |
| 2011/0148170 A1* | 6/2011 | Grable | ............ | B60N 2/859 |
| | | | | 297/408 |
| 2014/0015288 A1* | 1/2014 | Tachikawa | ............ | B60N 2/859 |
| | | | | 297/61 |
| 2015/0159721 A1* | 6/2015 | Okubo | ............ | F16F 7/108 |
| | | | | 297/452.18 |
| 2019/0275917 A1* | 9/2019 | Kubota | ............ | B60N 2/206 |

* cited by examiner

VEHICLE HEAD RESTRAINT WITH ARTICULATING SURFACE

INTRODUCTION

The subject disclosure relates to the art of vehicles and, more particularly, to a vehicle head restraint including an articulating surface.

Most modern vehicles include a head restraint system that limits rearward excursion of a driver's or passenger's head. When a vehicle is subjected to a forward focused force, such as during a rear end collision, reactive forces drive heads and necks rearwardly. Rearward excursions of a neck or a head may be detrimental to the driver and/or passenger. In order to limit such excursions, vehicles include a head restraint that extends upward from a seatback. Head restraints are provided on both front, (i.e., driver and front passenger seats), and rear passenger seats of the vehicle.

Head restraints on rear passenger seats often pose a number of challenges. If the rear seat folds forward, the head restraint may interfere with a front seatback. In other cases, the head restraint limits forward folding of the seatback. That is the head restraint may contact a seat base stopping any additional folding. When the rear seatback is held up by the head restraint engaging the seat base, there are limits imposed on how and what may be stored on the rear seat. Accordingly, it is desirable to provide a system for allowing a rear seatback including a head restraint to fold fully forward.

SUMMARY

In accordance with a non-limiting example, a vehicle head restraint includes a head restraint support, a first head restraint member fixedly coupled to the head restraint support, and a second head restraint member attached to the first head restraint member. The second head restraint member is selectively moveable relative to the first head restraint member.

In addition to one or more of the features described herein a hinge connects the first head restraint member to the second head restraint member.

In addition to one or more of the features described herein the first head restraint member includes a forwardly facing surface including a first bracket member.

In addition to one or more of the features described herein the second head restraint member includes a rearwardly facing surface portion including a second bracket member.

In addition to one or more of the features described herein the hinge includes a first hinge support connected to the first bracket member and a second hinge support connected to the second bracket member.

In addition to one or more of the features described herein the head restraint support includes a first support member extending from the first head restraint member, a second support member extending from the first head restraint member, and a bridge member arranged in the first head restraint member, the bridge member joining the first support member and the second support member.

In addition to one or more of the features described herein the hinge is operatively connected to the bridge member.

In addition to one or more of the features described herein the hinge comprises a piano hinge.

In addition to one or more of the features described herein the hinge includes a biasing member.

In addition to one or more of the features described herein the biasing member urges the second head restraint member toward the first head restraint member.

Disclosed in accordance with another non-limiting example is a vehicle including a body supported by a plurality of wheels. The body defines a passenger compartment. A seat including a seatback is arranged in the passenger compartment. A head restraint is mounted to the seatback. The head restraint includes a head restraint support extending into the seatback, a first head restraint member fixedly coupled to the head restraint support, and a second head restraint member attached to the first head restraint member. The second head restraint member being selectively moveable relative to the first head restraint member.

In addition to one or more of the features described herein a hinge connects the first head restraint member to the second head restraint member.

In addition to one or more of the features described herein the first head restraint member includes a forwardly facing surface including a first bracket member.

In addition to one or more of the features described herein the second head restraint member includes a rearwardly facing surface portion including a second bracket member.

In addition to one or more of the features described herein the hinge includes a first hinge support connected to the first bracket member and a second hinge support connected to the second bracket member.

In addition to one or more of the features described herein the head restraint support includes a first support member extending from the first head restraint member, a second support member extending from the first head restraint member, and a bridge member arranged in the first head restraint member, the bridge member joining the first support member and the second support member.

In addition to one or more of the features described herein the hinge is operatively connected to the bridge member.

In addition to one or more of the features described herein the hinge comprises a piano hinge.

In addition to one or more of the features described herein the hinge includes a biasing member.

In addition to one or more of the features described herein the biasing member urges the second head restraint member toward the first head restraint member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
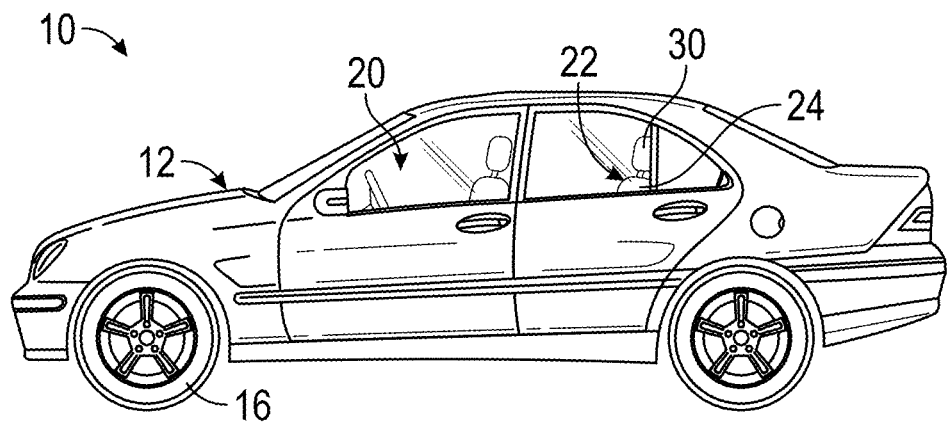
FIG. 1 is a side view of a vehicle including an articulating head restraint, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that includes at least one rear passenger seat 22. Rear passenger seat 22 includes a foldable seatback 24 that supports a head restraint 30. Foldable seatback 24 may be folded or rotated forward in order to reconfigure passenger compartment 20 to accommodate various articles such as packages, shopping bags and the like.

Figure 2:
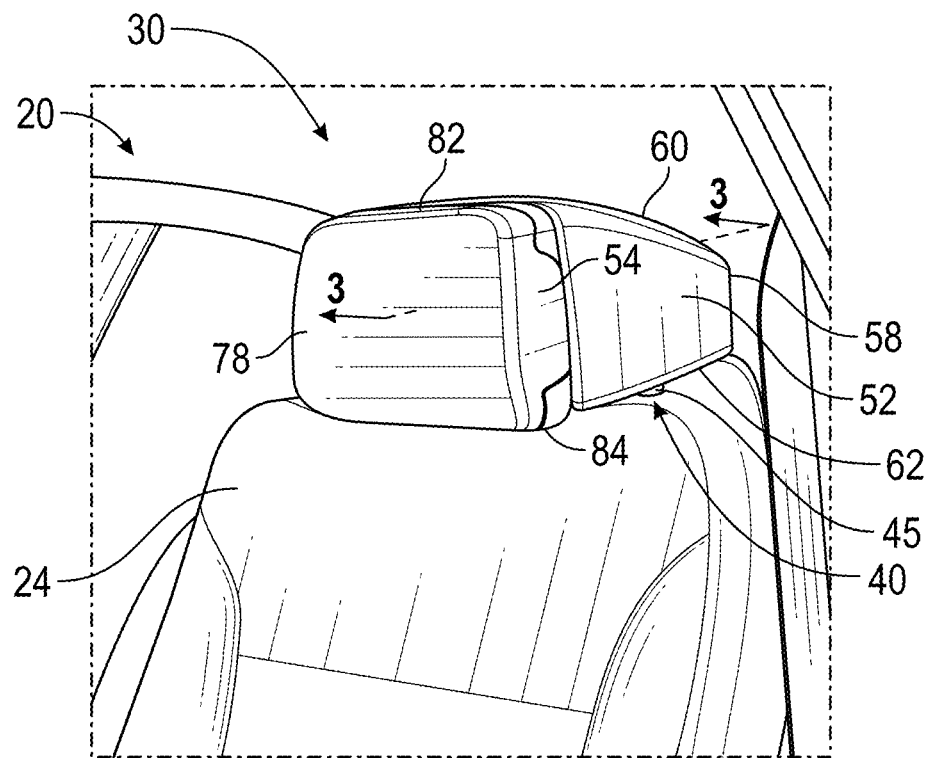
FIG. 2 is a partial perspective view of a seatback including the articulating head restraint, in accordance with a non-limiting example.
Figure 3:
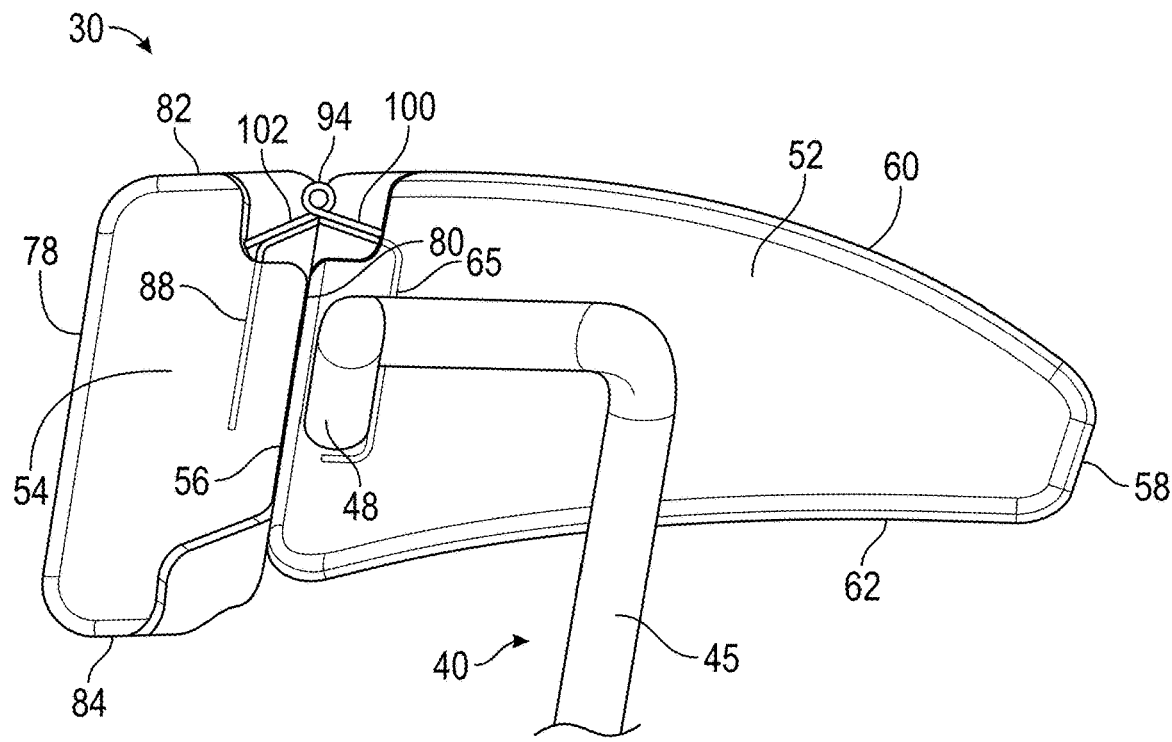
FIG. 3 is a side sectional view of the articulating head restraint of FIG. 2 taken along the line 3-3 including a first head restraint member and a second head restraint member.
Figure 4:
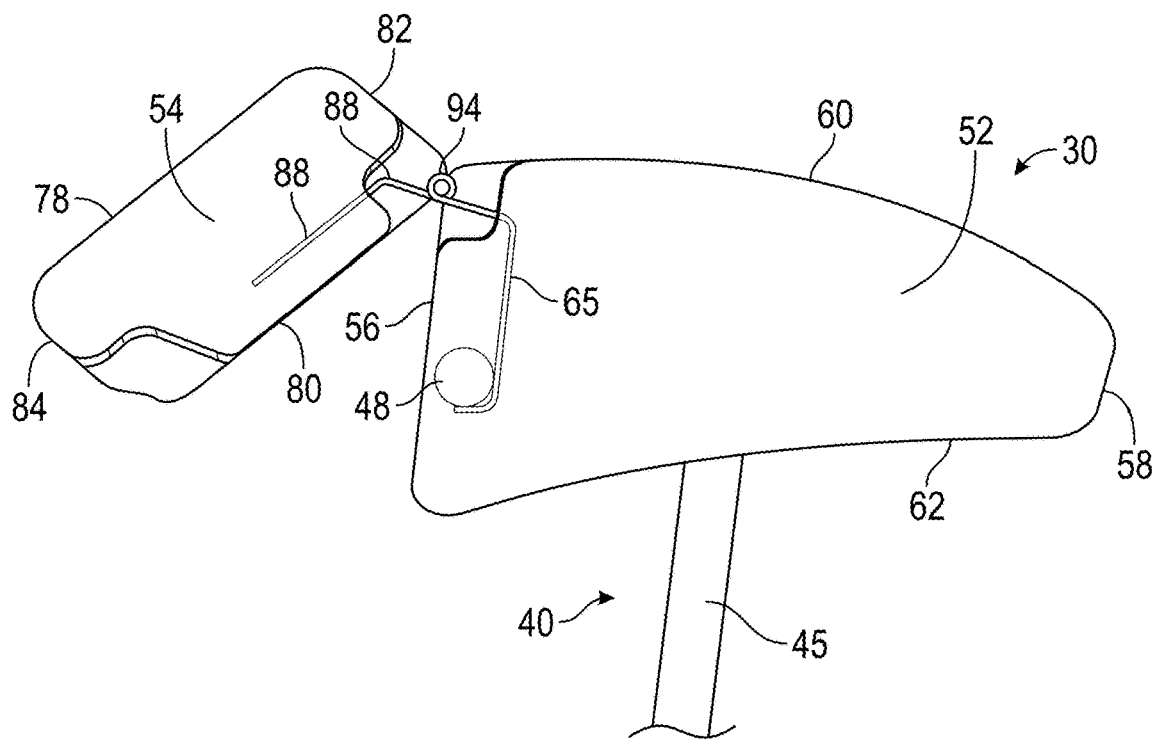
FIG. 4 depicts the second head restraint member of FIG. 3 articulating relative to the first head restraint member, in accordance with a non-limiting example.

In a non-limiting example shown in FIG. 2, head restraint 30 includes a head restraint support 40 that extends into foldable seatback 24. Head restraint support 40 includes a first support member 43 (FIG. 5), a second support member 45, and a bridge member 48 (FIG. 3) that joins first support member 43 to second support member 45 within head restraint 30. Referring to FIG. 3 and with continued reference to FIG. 2, head restraint 30 includes a first head restraint member 52 connected to first and second support member 43 and 45 and a second head restraint member 54 coupled to first head restraint member 52. As will be detailed herein, second head restraint member 54 is articulable relative to first head restraint member 52 as shown in FIG. 4.

In a non-limiting example, first head restraint member 52 includes a forwardly facing surface 56, a rearwardly facing surface 58, an upper surface 60, and a lower surface 62. Upper and lower surfaces 60 and 62 extend from forwardly facing surface 56 and converge at rearwardly facing surface 58 in a non-limiting example. A first bracket 65 extends from forwardly facing surface 56 adjacent to upper surface 60 into first head restraint member 52. First bracket 65 may connect with bridge member 48 in a non-limiting example.

In a non-limiting example, second head restraint member 54 includes a forwardly facing surface portion 78, a rearwardly facing surface portion 80, an upper surface portion 82, and a lower surface portion 84. Upper and lower surface portions 82 and 84 extend between forwardly facing surface portion 78 and rearwardly facing surface portion 80 in a non-limiting example. A second bracket 88 extends from upper surface portion 82 adjacent rearwardly facing surface portion 80 into second head restraint member 54.

Figure 5:
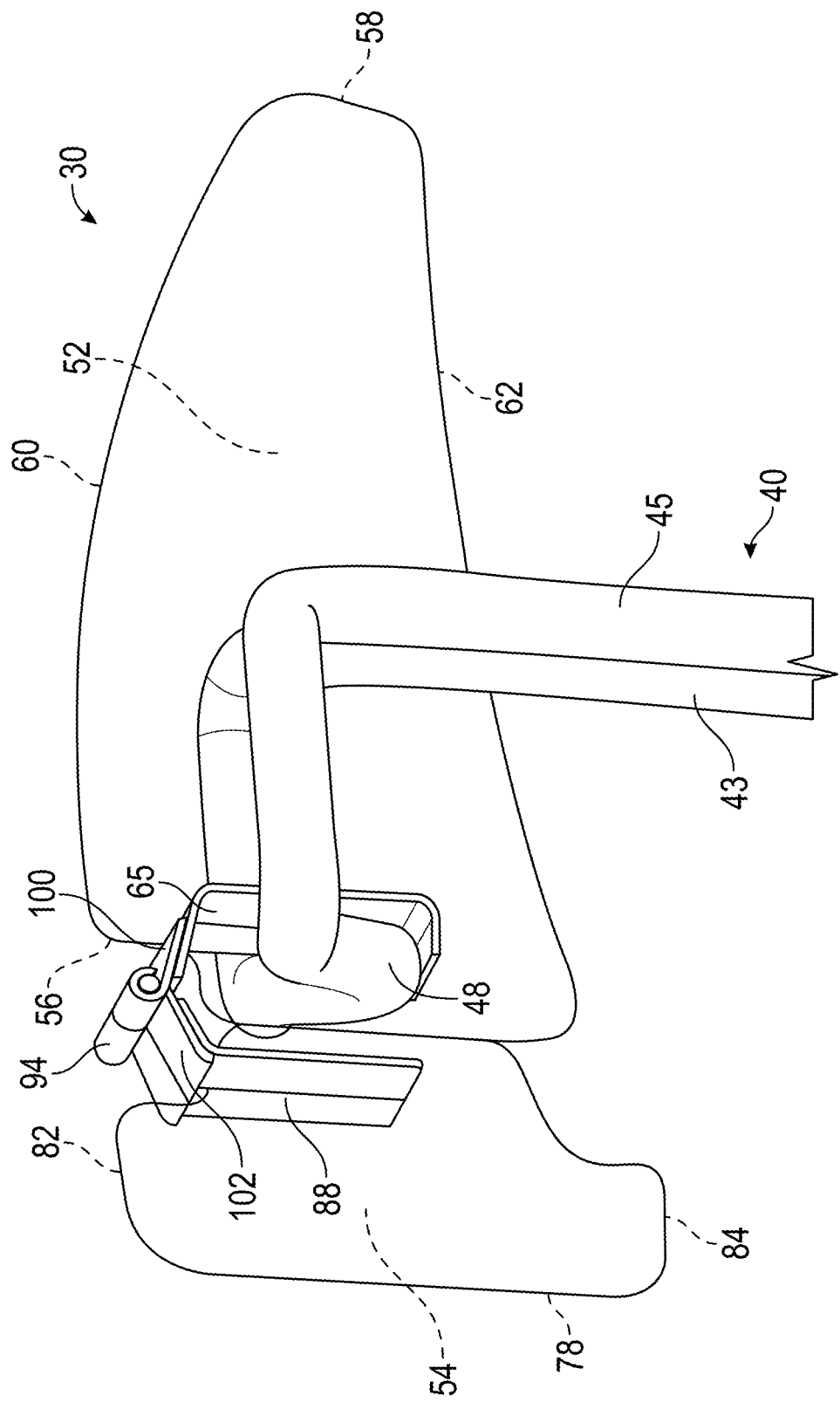
FIG. 5 is a glass view of the articulating head restraint of FIG. 3, in accordance with a non-limiting example.
Figure 6:
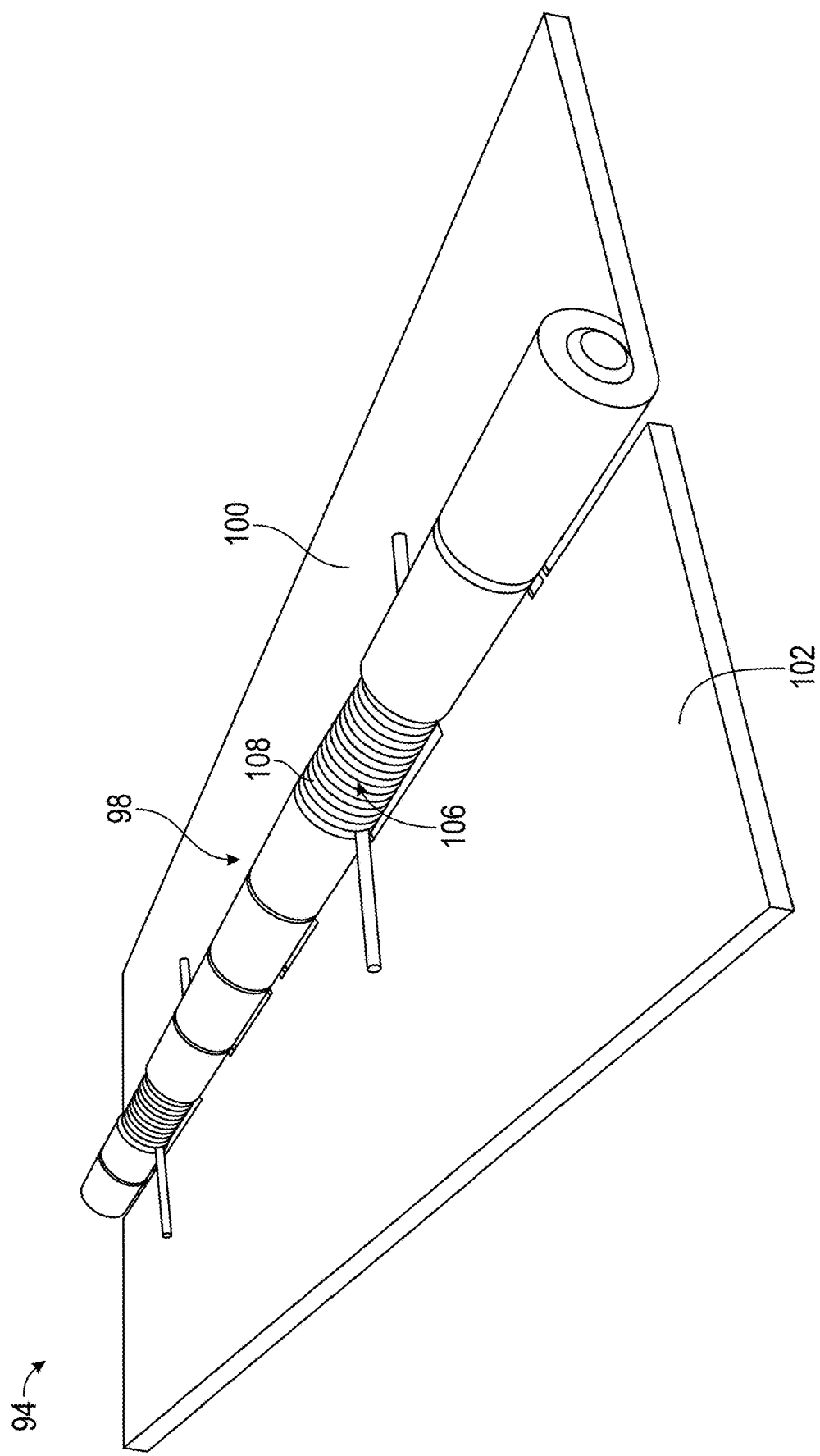
FIG. 6 depicts a hinge that joins the second articulating head restraint member to the first articulating head restraint member.

In a non-limiting example, second head restraint member 54 is pivotally attached to first head restraint member 52 through a hinge 94. Referring to FIGS. 5 and 6 and with continued reference to FIG. 4, hinge 94 may take the form of a piano hinge 98 in accordance with a non-limiting example. Piano hinge 98 ensures minimal gaps exist between second head restraint member 54 and first head restraint member 52. In a non-limiting example, hinge 94 includes a first hinge support 100 connected to first bracket 65 and a second hinge support 102 connected to second bracket 88. A biasing member 106, shown in the form of a spring 108 is provided on hinge 94. Biasing member 106 urges second head restraint member 54 toward first head restraint member 52 when foldable seatback 24 is in an upright configuration (FIG. 2).

Figure 7:
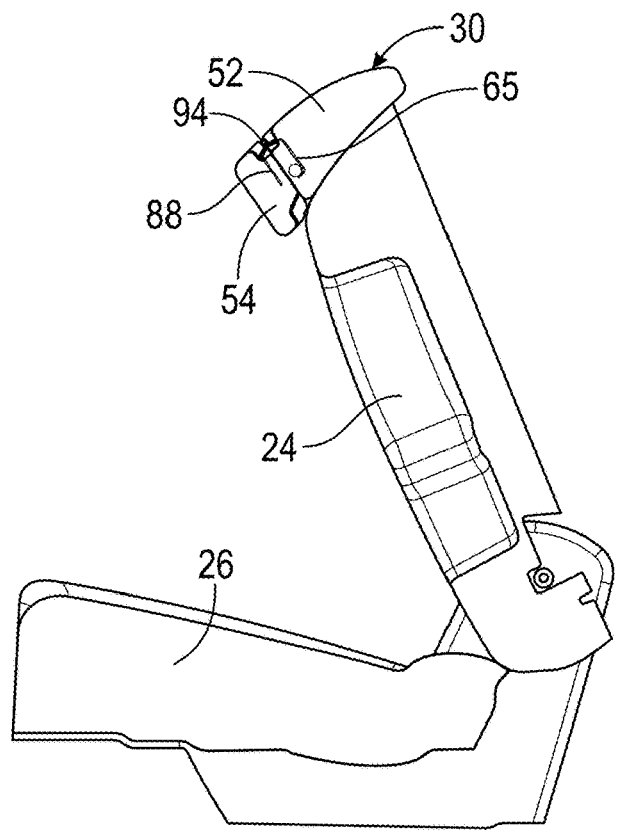
FIG. 7 depicts the seatback of FIG. 2 beginning a forward transition, in accordance with a non-limiting example.
Figure 8:
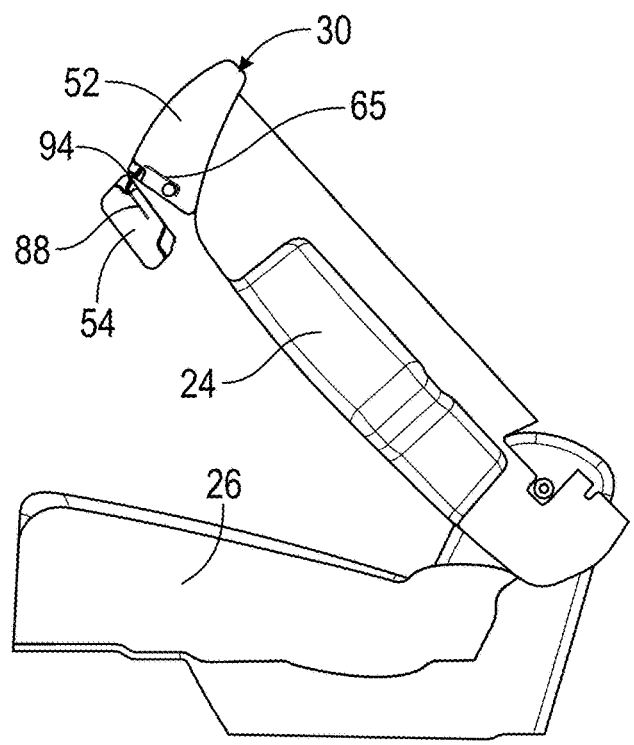
FIG. 8 depicts the seatback of FIG. 7 showing the second head restraint member beginning to articulate relative to the first head restraint member as the seatback continues to transition forward, in accordance with a non-limiting example.
Figure 9:
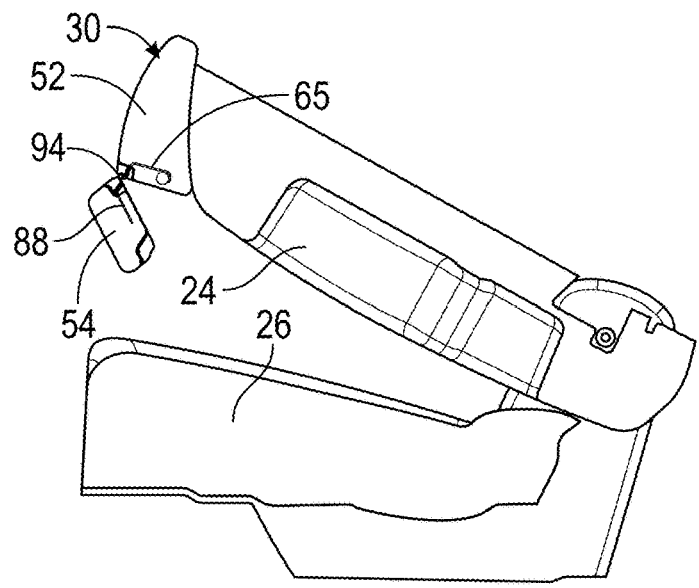
FIG. 9 depicts the seatback of FIG. 8 showing the second head restraint member further articulating relative to the first head restraint member as the seatback continues to transition forward, in accordance with a non-limiting example.
Figure 10:
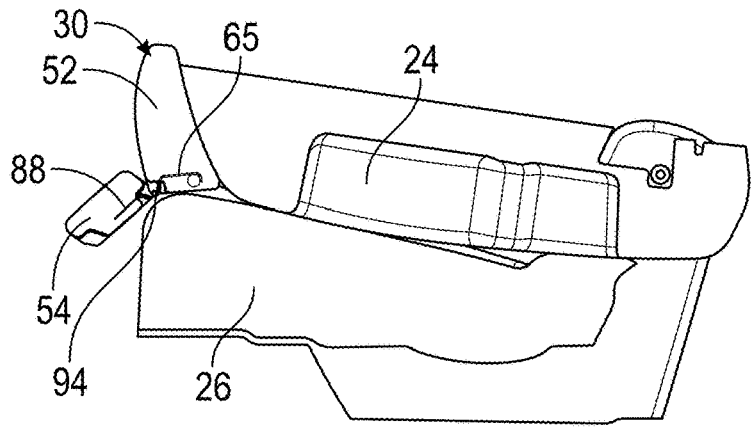
FIG. 10 depicts the seatback of FIG. 9 substantially fully articulated as the seatback continues to transition forward, in accordance with a non-limiting example.
Figure 11:
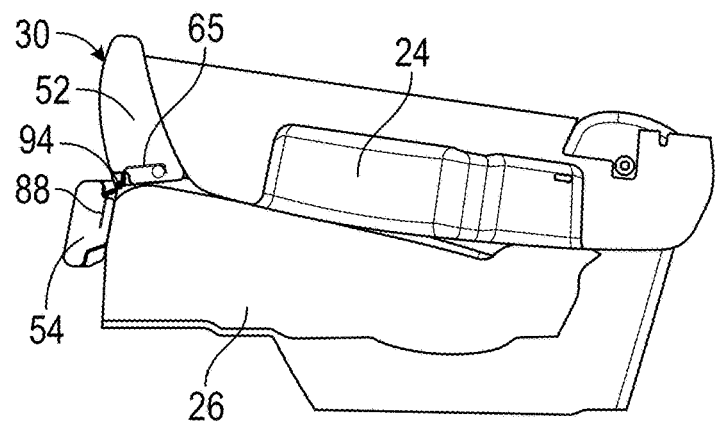
FIG. 11 depicts the seatback of FIG. 10 showing the second head restraint member resting against a forward edge of a seat base as the seatback rests in a fully forward position, in accordance with a non-limiting example.

In a non-limiting example, second head restraint member 54 may be pivoted and moved away from first head restraint member 52 to allow foldable seatback 24 to lay flatter when resting on seat base 26. In a non-limiting example, foldable seatback 24 may be transitioned forward, as shown in FIG. 7 to lie against seat base 26 (FIG. 11) in order to reconfigure passenger compartment 20. As foldable seatback 24 transitions, second head restraint member 54 begins to rotate outwardly as shown in FIG. 8. Further rotation of foldable seatback 24 leads to increased rotation of second head restraint member 54 relative to first head restraint member 52 as shown in FIGS. 9 and 10. When fully folded as shown in FIG. 11, second head restraint member 54 may rest against a forward edge (not separately labeled) of seat base 26. In this configuration, gaps between foldable seatback 24 and seat base 26 may be reduced and/or eliminated.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle head restraint comprising:
    a head restraint support;
    a first head restraint member fixedly coupled to the head restraint support, the first head restraint member including a forwardly facing surface and an upper surface;
    a second head restraint member attached to the first head restraint member, the second head restraint member including a rearwardly facing surface portion and an upper surface portion; and
    a hinge member arranged between the forwardly facing surface and the rearwardly facing surface portion at the upper surface and the upper surface portion, the hinge member connecting the first head restraint member to the second head restraint member with the second head restraint member being selectively moveable relative to the first head restraint member about the hinge member.

2. The vehicle head restraint according to claim 1, wherein the forwardly facing surface of the first head restraint member includes a first bracket member.

3. The vehicle head restraint according to claim 2, wherein the rearwardly facing surface portion of the second head restraint member includes a second bracket member.

4. The vehicle head restraint according to claim 3, wherein the hinge includes a first hinge support connected to the first bracket member and a second hinge support connected to the second bracket member.

5. The vehicle head restraint according to claim 1, wherein the head restraint support includes a first support member extending from the first head restraint member, a second support member extending from the first head restraint member, and a bridge member arranged in the first head restraint member, the bridge member joining the first support member and the second support member.

6. The vehicle head restraint according to claim 5, wherein the hinge is operatively connected to the bridge member.

7. The vehicle head restraint according to claim 1, wherein the hinge comprises a piano hinge.

8. The vehicle head restraint according to claim 1, wherein the hinge includes a biasing member.

9. The vehicle head restraint according to claim 8, wherein the biasing member urges the second head restraint member toward the first head restraint member.

10. A vehicle comprising:
   a body supported by a plurality of wheels, the body defining a passenger compartment;
   a seat including a seatback arranged in the passenger compartment; and
   a head restraint mounted to the seatback, the head restraint comprising:
      a head restraint support extending into the seatback;
      a first head restraint member fixedly coupled to the head restraint support, the first head restraint member including a forwardly facing surface and an upper surface;
      a second head restraint member attached to the first head restraint member, the second head restraint member including a rearwardly facing surface portion and an upper surface portion; and
      a hinge member arranged between the forwardly facing surface and the rearwardly facing surface portion at the upper surface and the upper surface portion, the hinge member connecting the first head restraint member to the second head restraint member with the second head restraint member being selectively moveable relative to the first head restraint member about the hinge member.

11. The vehicle according to claim 10, wherein the forwardly facing surface of the first head restraint member includes a first bracket member.

12. The vehicle according to claim 11, wherein the rearwardly facing surface portion of the second head restraint member includes a second bracket member.

13. The vehicle according to claim 12, wherein the hinge includes a first hinge support connected to the first bracket member and a second hinge support connected to the second bracket member.

14. The vehicle according to claim 10, wherein the head restraint support includes a first support member extending from the first head restraint member, a second support member extending from the first head restraint member, and a bridge member arranged in the first head restraint member, the bridge member joining the first support member and the second support member.

15. The vehicle according to claim 14, wherein the hinge is operatively connected to the bridge member.

16. The vehicle according to claim 10, wherein the hinge comprises a piano hinge.

17. The vehicle according to claim 10, wherein the hinge includes a biasing member.

18. The vehicle according to claim 17, wherein the biasing member urges the second head restraint member toward the first head restraint member.

\* \* \* \* \*